United States Patent
Ohtaki et al.

(10) Patent No.: US 7,302,817 B2
(45) Date of Patent: Dec. 4, 2007

(54) APPARATUS FOR RESTRICTING ACTIVATION OF ENGINE STARTING SYSTEM

(75) Inventors: Kiyokazu Ohtaki, Aichi (JP); Shoichi Harada, Aichi (JP); Masanari Okuno, Aichi (JP); Osamu Shoji, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 306 days.

(21) Appl. No.: 10/446,469

(22) Filed: May 28, 2003

(65) Prior Publication Data

US 2004/0003632 A1    Jan. 8, 2004

(30) Foreign Application Priority Data

May 29, 2002 (JP) .............................. 2002-156193
May 29, 2002 (JP) .............................. 2002-156194

(51) Int. Cl.
*B60R 25/02* (2006.01)
(52) U.S. Cl. .................. 70/186; 70/252; 70/DIG. 30
(58) Field of Classification Search .................. 70/252, 70/182–186, DIG. 30; 477/99; 180/287; 307/10.3, 10.4, 10.5, 10.6
See application file for complete search history.

(56) References Cited

U.S. PATENT DOCUMENTS

| 4,837,567 | A | * | 6/1989 | Kleefeldt et al. | .......... 340/5.72 |
|---|---|---|---|---|---|
| 4,982,584 | A | * | 1/1991 | Takeda et al. | ............... 70/252 |
| 5,685,183 | A | * | 11/1997 | Hattori et al. | ............... 70/252 |
| 5,982,295 | A | * | 11/1999 | Goto et al. | ............. 340/10.52 |
| 6,006,887 | A | * | 12/1999 | Tazai | ..................... 192/220.2 |
| 6,260,651 | B1 | * | 7/2001 | Kokubu et al. | ............. 180/287 |
| 6,354,120 | B1 | * | 3/2002 | Tan et al. | ..................... 70/252 |
| 6,439,014 | B1 | * | 8/2002 | Syamoto | ....................... 70/247 |
| 6,487,883 | B2 | * | 12/2002 | Suzuki et al. | ................. 70/247 |
| 6,810,700 | B2 | * | 11/2004 | Okuno | ........................ 70/186 |
| 6,881,173 | B2 | * | 4/2005 | Harada et al. | ................. 477/99 |
| 2004/0027239 | A1 | * | 2/2004 | Hayashi et al. | ............ 340/5.61 |

FOREIGN PATENT DOCUMENTS

DE          4037918         11/1991

(Continued)

OTHER PUBLICATIONS

European Search Report, dated Sep. 3, 2004, issued in corresponding European Application No. EP 03 44 5064.

*Primary Examiner*—Lloyd A. Gall
(74) *Attorney, Agent, or Firm*—Synnestvedt & Lechner LLP

(57) ABSTRACT

An activation restricting apparatus for an engine starting system that may be produced with a compact size. The apparatus includes an operating mechanism, an actuator, and a control unit. The operating mechanism starts and stops the engine and has a plurality of positions including a LOCK position. The operating mechanism includes a first stopper prohibiting movement of the operating mechanism from the LOCK position and a second stopper prohibiting movement of the operating mechanism to the LOCK position. The control unit enables the engine to be started when the operating mechanism is in the LOCK position and a first ID code sent from a portable device matches a second ID code. The control unit enables the operating mechanism to be moved to the LOCK position when the operating mechanism is not in the LOCK position and the vehicle is not moving.

8 Claims, 11 Drawing Sheets

FOREIGN PATENT DOCUMENTS

| | | |
|---|---|---|
| DE | 19951986 | 10/1999 |
| DE | 19821899 | 12/1999 |
| GB | 1497294 | 1/1978 |
| JP | 58-025759 | 2/1983 |
| JP | 58-071236 | 4/1983 |
| JP | 10-236280 | 9/1998 |
| JP | 10-315914 | 12/1998 |
| JP | 11-091508 | 4/1999 |
| JP | 2000-225923 | 8/2000 |
| JP | 2000-229557 | 8/2000 |
| JP | 2001-303810 | 10/2001 |
| JP | 2002-067880 | 3/2002 |

\* cited by examiner

Solenoid OFF
Lock Position

Solenoid ON
Unlock Position

Solenoid ON
Lock Position

Solenoid OFF
ACC Position

Solenoid OFF
START Position

Solenoid OFF
LOCK Position

Solenoid ON
LOCK Position

Solenoid ON
ACC Position

Solenoid OFF
ACC Position

Solenoid OFF
ON Position

APPARATUS FOR RESTRICTING ACTIVATION OF ENGINE STARTING SYSTEM

BACKGROUND OF THE INVENTION

The present invention relates to an apparatus for restricting activation of an engine starting system.

In the prior art, interlocking mechanisms are included in automobiles for safety reasons. When the automobile is being driven, an interlocking mechanism restricts the activation of a steering lock apparatus by preventing a key inserted into a key cylinder from being removed. An electric interlocking mechanism includes a key interlocking solenoid to permit or prohibit the insertion of the key.

Various types of mechanisms have been proposed to prevent theft of an automobile. For example, a smart ignition apparatus has been proposed to permit the starting of an engine when an ID code stored in a portable device matches an ID code stored in the automobile. The smart ignition apparatus includes a knob locking solenoid to permit or prohibit the turning of a starter knob. The smart ignition apparatus uses an ID code that provides a higher degree of confidentiality than a mechanical key. Thus, the smart ignition apparatus is highly effective for preventing thefts.

However, since the number of automobiles equipped with the smart ignition apparatus is still small, it is difficult to reduce the production cost of the smart ignition apparatus. To lower the manufacturing cost, for example, an elongated cover for entirely covering the engine starting system may be used in both automobiles equipped with the smart ignition apparatus and automobiles that are not equipped with the smart ignition apparatus.

However, when the smart ignition apparatus is added to the electric key interlocking apparatus, the knob locking solenoid becomes necessary in addition to the key interlocking solenoid. Thus, space for the knob locking solenoid is required in addition to the space for the key interlocking solenoid. This enlarges the entire engine starting system.

Further, the elongated cover that covers the engine starting system cannot be used when two solenoids are used. As a result, two types of elongated covers are necessary, and the manufacturing cost of the engine starting system cannot be reduced.

SUMMARY OF THE INVENTION

One aspect of the present invention is an apparatus for restricting activation of a starting system of an engine of a vehicle and for use with a portable device that transmits a first ID code. The apparatus includes an operating means for manually starting and stopping the engine and having a plurality of operation positions including a LOCK position in which the operating means is locked. The operating means includes a first stopper, which prohibits movement of the operating means from the LOCK position to a position other than the LOCK position, and a second stopper, which prohibits movement of the operating means to the LOCK position from a position other than the LOCK position. An actuator engages the first and second stoppers. A control means is connected to the actuator to control the actuator. The control means enables the engine to be started by disengaging the actuator from the first stopper when the operating means is in the LOCK position and the first ID code sent from the portable device matches a predetermined second ID code of the control means. The control means enables the operating means to be moved to the LOCK position by disengaging the actuator from the second stopper when the operating means is in a position other than the LOCK position and the vehicle is not moving.

Another aspect of the present invention is an apparatus for restricting activation of a starting system of an engine of a vehicle and for use with a portable device operable for sending a first ID code. The apparatus includes an operating means for manually starting and stopping the engine and having a plurality of operation positions including a LOCK position in which the operating means is locked. The operating means includes a first projection, which prohibits movement of the operating means from the LOCK position to a position other than the LOCK position, and a second projection, which prohibits movement of the operating means to the LOCK position from a position other than the LOCK position. An actuator engages the first and second stoppers. An intervening member is arranged between the actuator and the second projection to engage the second projection in cooperation with the actuator. An actuator control means is connected to the actuator to control the actuator. An ID code verification means is connected to the actuator control means to determine whether the first ID code when sent from the portable device matches a second ID code. A shift lock control means is connected to the actuator for enabling the operating means to be moved to the LOCK position by disengaging the intervening member from the second projection when the operating means is in a position other than the LOCK position and the vehicle is not moving. The actuator control means enables the engine to be started by disengaging the actuator from the first projection when the operating means is in the LOCK position and the first ID code matches the second ID code.

A further aspect of the present invention is a method for controlling a system for starting an engine of a vehicle. The engine starting system includes an operating mechanism for manually starting and stopping the engine and having a plurality of operation positions including a LOCK position in which the operating mechanism is locked. The operating mechanism includes a first stopper, which prohibits movement of the operating mechanism from the LOCK position to a position other than the LOCK position, and a second stopper, which prohibits movement of the operating mechanism to the LOCK position from a position other than the LOCK position. An actuator engages the first and second stoppers. A portable device transmits a first ID code. A communication controller is installed in the vehicle and stores a second ID code. The method includes when the operating mechanism is located at the LOCK position, determining whether the first code transmitted from the portable device matches the second code with the communication controller, and enabling the engine to be started by disengaging the actuator from the first stopper when the first ID code matches the second ID code. The method also includes when the operating mechanism is located at a position other than the LOCK position, determining whether the vehicle is not moving, and enabling the operating mechanism to be moved to the LOCK position by disengaging the actuator from the second stopper when the vehicle is not moving.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1A:
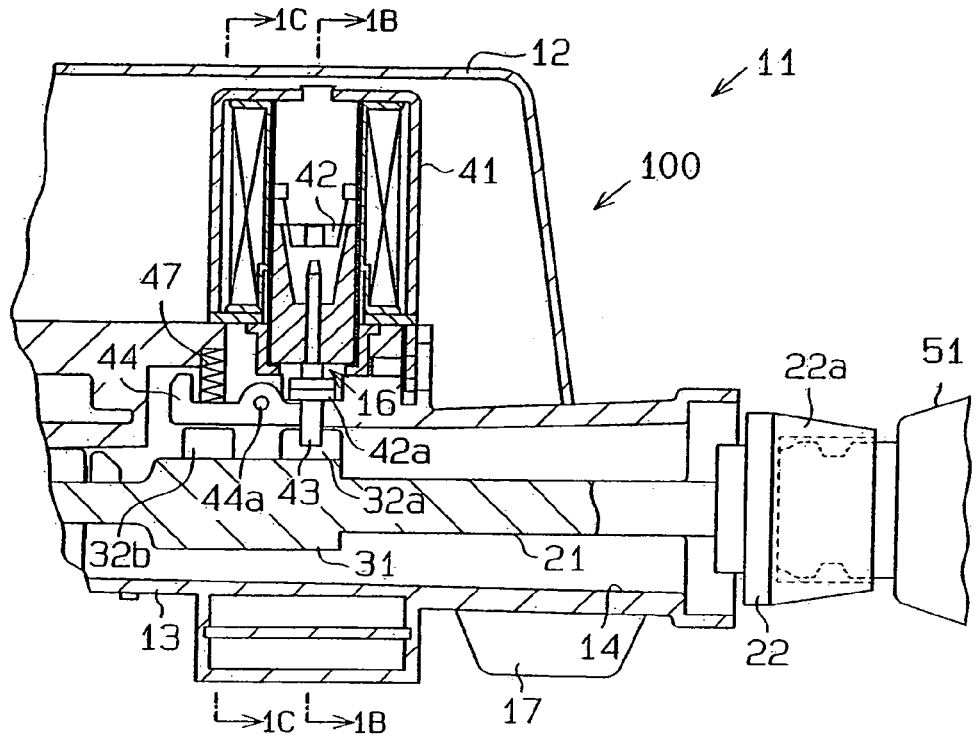
FIG. 1A is a schematic cross-sectional view showing an activation restricting apparatus of an engine starting system according to a first embodiment of the present invention.

In the drawings, like numerals are used for like elements throughout.

Figure 1B:
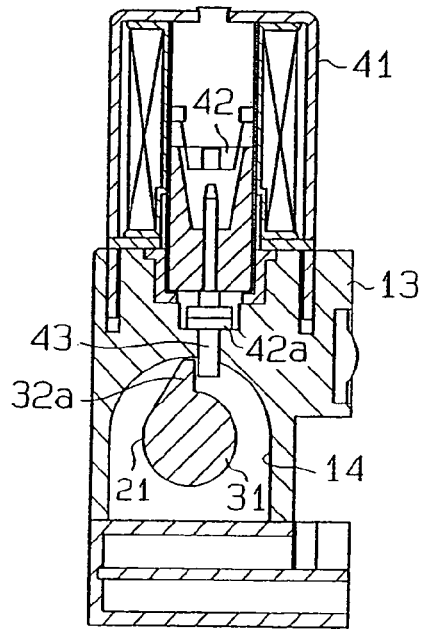
FIG. 1B is a cross-sectional view taken along line 1B-1B in FIG. 1A.
Figure 1C:
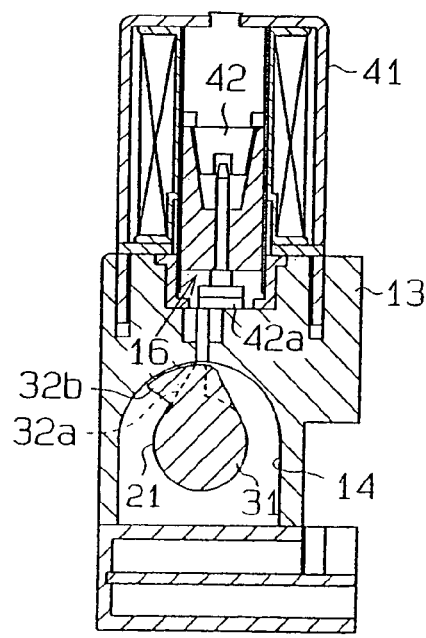
FIG. 1C is a cross-sectional view taken along line 1C-1C in FIG. 1A.

FIGS. 1A to 1C are schematic cross-sectional diagrams showing an activation restricting apparatus 100 of an engine starting system 11 according to a first embodiment of the present invention.

The engine starting system 11 has a metal cylinder 13. An immobilizer amplifier 17 is connected to a lower surface of the cylinder 13. The cylinder 13 includes a bore 14 and an accommodating portion 16, which is connected with the bore 14. A camshaft 21 is retained in the bore 14. A starter knob 22 is connected to one end of the camshaft 21. The starter knob 22 is turned between an ACC position and a LOCK position. The starter knob 22 includes a tab 22a. The tab 22a is used to turn the starter knob 22. This rotates the camshaft 21 and starts or stops the engine. In the first embodiment, the camshaft 21 and the starter knob 22 function as an operating means.

Figure 2:
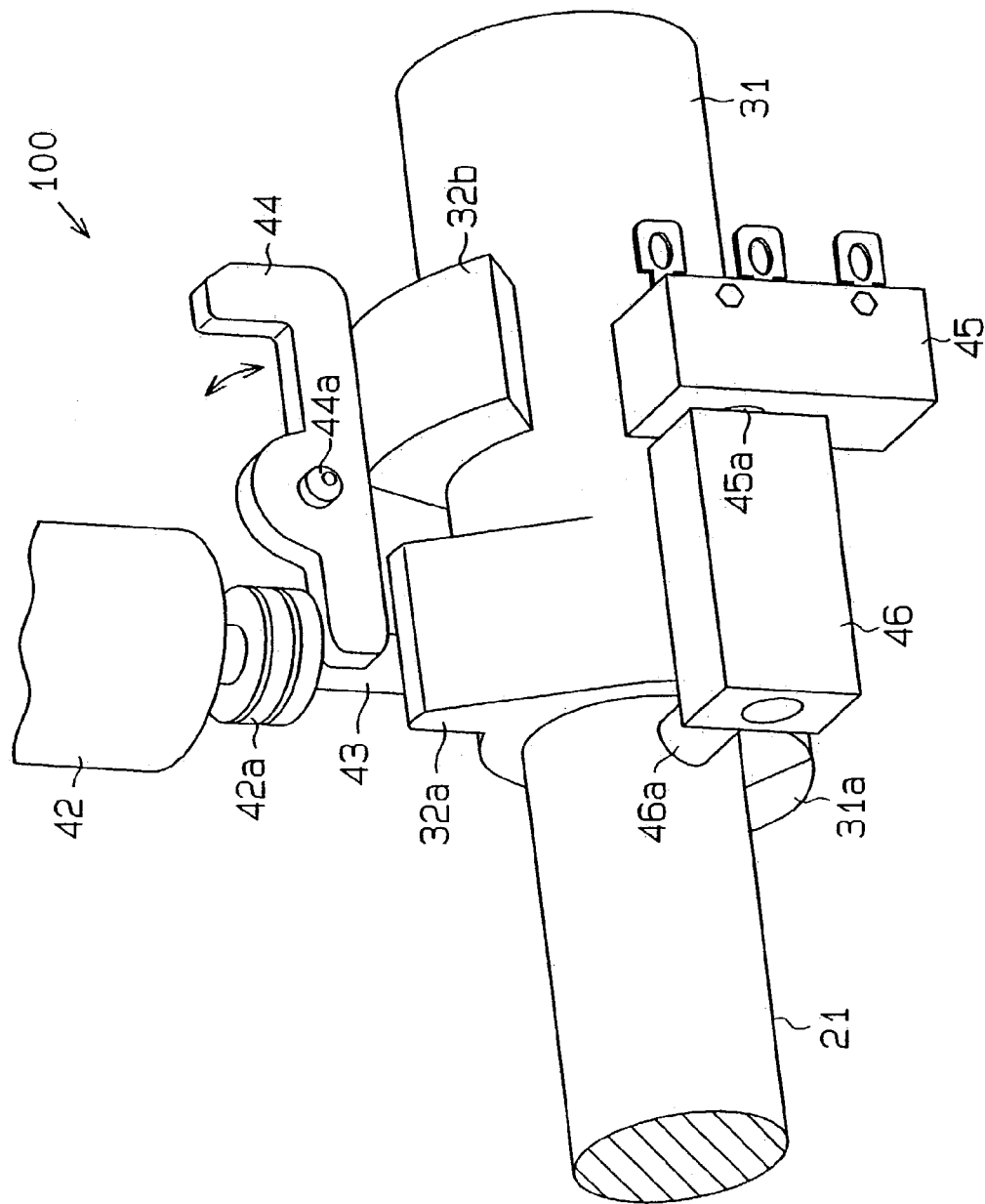
FIG. 2 is a perspective view showing the activation restricting apparatus of FIG. 1A.

As shown in FIG. 2, the camshaft 21 includes a cam 31. A first projection 32a, which serves as a first stopper, and a second projection 32b, which serves as a second stopper, extend from the surface of the cam 31. When the starter knob 22 is located at the LOCK position, the first projection 32a restricts the movement of the starter knob 22 to the ACC position. When the starter knob 22 is located at positions other than the LOCK position (e.g., ACC position, ON position, or START position), the second projection 32b restricts the movement of the starter knob 22 to the LOCK position.

Referring to FIGS. 1A to 1C, a solenoid 41, which serves as an actuator, is attached to the cylinder 13. The solenoid 41 includes a plunger 42. A stopper pin 43 is connected to the plunger 42 by a damper 42a. The stopper pin 43 extends vertically in the accommodating portion 16, as viewed in FIGS. 1A to 1C. Further, the stopper pin 43 is movable in the vertical direction.

When the solenoid 41 is de-excited (inactivated) as shown in the state of FIGS. 1A and 1B, the stopper pin 43 is projected to engage the first projection 32a. When the solenoid 41 is excited (activated) as shown in the state of FIG. 1C, the stopper pin 43 is retracted and disengaged from the first projection 32a. The stopper pin 43 engages the first projection 32a, for example, when the camshaft 21 is arranged at the LOCK position as shown in the state of FIG. 1B.

Referring to FIG. 2, a locking lever (second stopper) 44, which serves as an intervening member, is connected to the cylinder 13. The locking lever 44 is pivoted about a pivot pin 44a. The locking lever 44 has a first end (left end as viewed in FIG. 2) and a second end (right end as viewed in FIG. 2). The damper 42a pushes the locking lever 44 toward the first projection 32a. This moves the second end of the locking lever 44 away from the second projection 32b. An engaging spring 47 constantly urges the second end of the locking lever 44 toward the second projection 32b. Thus, a force is applied to the first end of the locking lever 44 in a direction in which the first end disengages the first projection 32a. When the camshaft 21 is in the ACC position, the locking lever 44 engages the second projection 32b.

As shown in FIG. 2, the cylinder 13 has a switch 45, which serves as switching means. The switch 45 goes ON and OFF when the starter knob 22 is turned between the LOCK position and the ACC position. Accordingly, the switch 45 activates and inactivates the solenoid 41. A block 46 (cooperative member) contacts or moves away from a contact 45a of the switch 45 to activate or inactivate the solenoid 41. In the first embodiment, when the block 46 is in contact with the contact 45a, the switch 45 goes OFF and the solenoid 41 is inactivated. When the block 46 moves away from the contact 45a and turns ON the switch 45 in a state in which the shift lever of the automatic transmission for the vehicle is in the parking position, the solenoid 41 is activated.

A spring (not shown) urges the block 46 toward the contact 45a of the switch 45. A cam follower 46a projects from the block 46 to engage a cam surface 31a of the cam 31. The portion of the cam surface 31a that contacts the cam follower 46a moves in the axial direction of the starter knob 22 in accordance with the turning of the starter knob 22. In other words, the block 46 moves axially in accordance with the turning of the starter knob 22.

Figure 3:
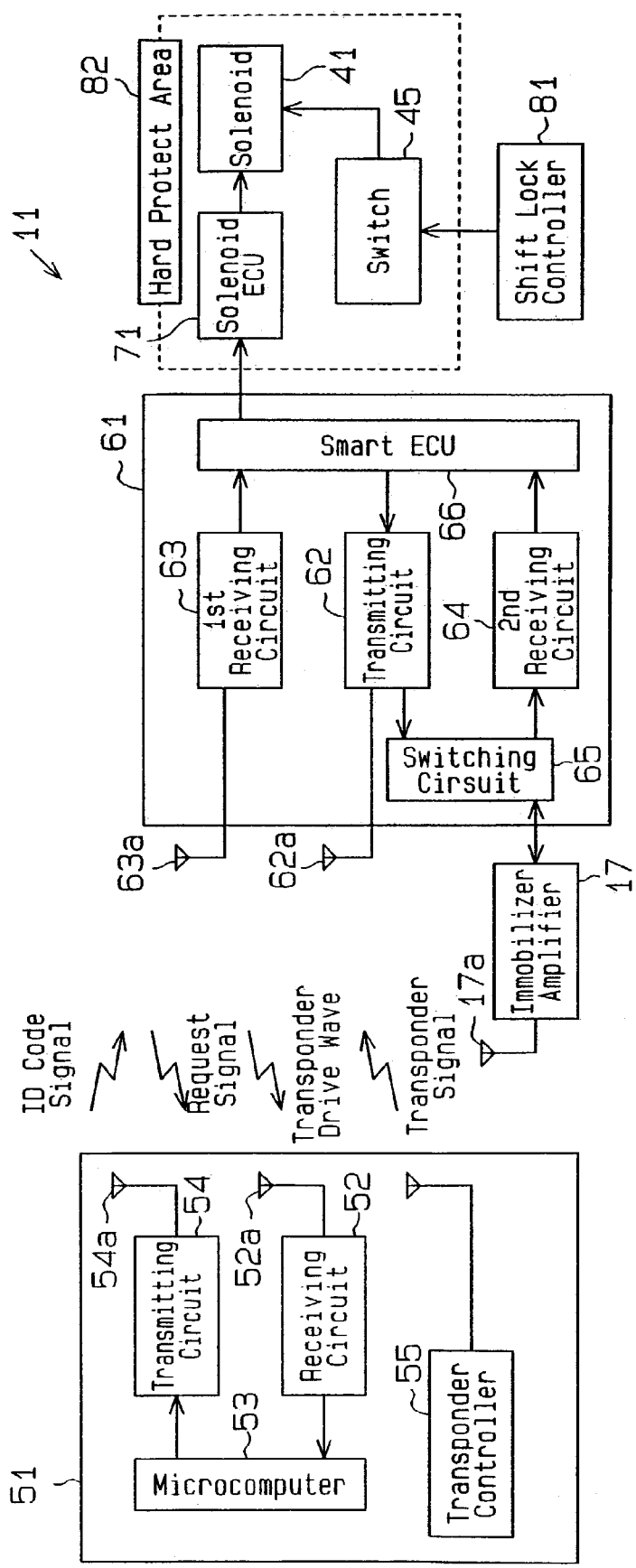
FIG. 3 is a schematic electric block diagram of an engine starting system in the first embodiment.

The electronic configuration of the engine starting system 11 will now be discussed with reference to FIGS. 3 and 4. As shown in FIG. 3, the engine starting system 11 includes a portable device 51, a communication controller 61, the solenoid 41, a solenoid electronic control unit (ECU) 71, a switch 45, and a shift lock controller 81.

The portable device 51 includes a receiving circuit 52, a microcomputer 53, a transmitting circuit 54, and a transponder controller 55. The receiving circuit 52 receives a request signal from the communication controller 61 and provides the request signal to the microcomputer 53. When receiving the request signal, the microcomputer 53 generates an ID code signal. The ID code signal includes a predetermined ID code and serves as a transmission signal. The transmitting circuit 54 uses the ID code signal to modulate a wave having a predetermined frequency and transmits the modulated wave to an external device. The receiving circuit 52 and the transmitting circuit 54 are respectively connected to antennas 52a and 54a.

When the transponder controller 55 receives sufficient energy through electromagnetic waves, the transponder controller 55 generates a transponder signal, which includes a predetermined transponder ID code. More specifically, the transponder controller 55 automatically generates a transponder signal having a predetermined frequency when receiving a transponder drive wave from the communication controller. Then, the transponder controller 55 transmits the transponder signal to the communication controller 61.

The communication controller 61, which is installed in the vehicle, includes a transmitting circuit 62, a first receiving circuit 63, a second receiving circuit 64, a switching circuit 65, and a smart ECU 66. The smart ECU 66 serves as a control means and an ID code verification means. The smart ECU 66 is connected to the first receiving circuit 63, the transmitting circuit 62, and the second receiving circuit 64.

The first receiving circuit 63 is connected to an antenna. The transmitting circuit 62 and the second receiving circuit 64 are connected to the switching circuit 65. The switching circuit 65 selectively connects the immobilizer amplifier 17 and the antenna 17a to the transmitting circuit 62 and the second receiving circuit 64. The immobilizer amplifier 17 amplifies the transponder signal received by the antenna 17a and provides the amplified transponder signal to the second receiving circuit 64.

The transmitting circuit 62 is connected to an antenna 62a, which is installed in the passenger compartment. The transmitting circuit 62 sends a request signal to the passenger compartment through the antenna 62a. The transmitting circuit 62 converts the transponder signal provided from the smart ECU 66 to a wave having a predetermined frequency and generates a transponder drive wave. The transponder drive wave is output through the antenna 17a.

The second receiving circuit 64 receives a transponder signal from the portable device 51 through the antenna 17a. Then, the second receiving circuit 64 de-modulates the transponder signal to a pulse signal and generates a second receiving signal. The second receiving signal is provided to the smart ECU 66.

The solenoid ECU 71, which serves as a control means and an actuator drive control means, is connected to the smart ECU 66. The solenoid ECU 71 is connected to the solenoid 41 to control the activation of the solenoid 41. The solenoid ECU 71, the solenoid 41, and the switch 45 are accommodated in a lock body 12, which serves as a cover. The portion closed by the lock body 12 serves as a hard protect area 82 in which the solenoid ECU 71, the solenoid 41, and the switch 45 are protected from external impacts.

Figure 4:
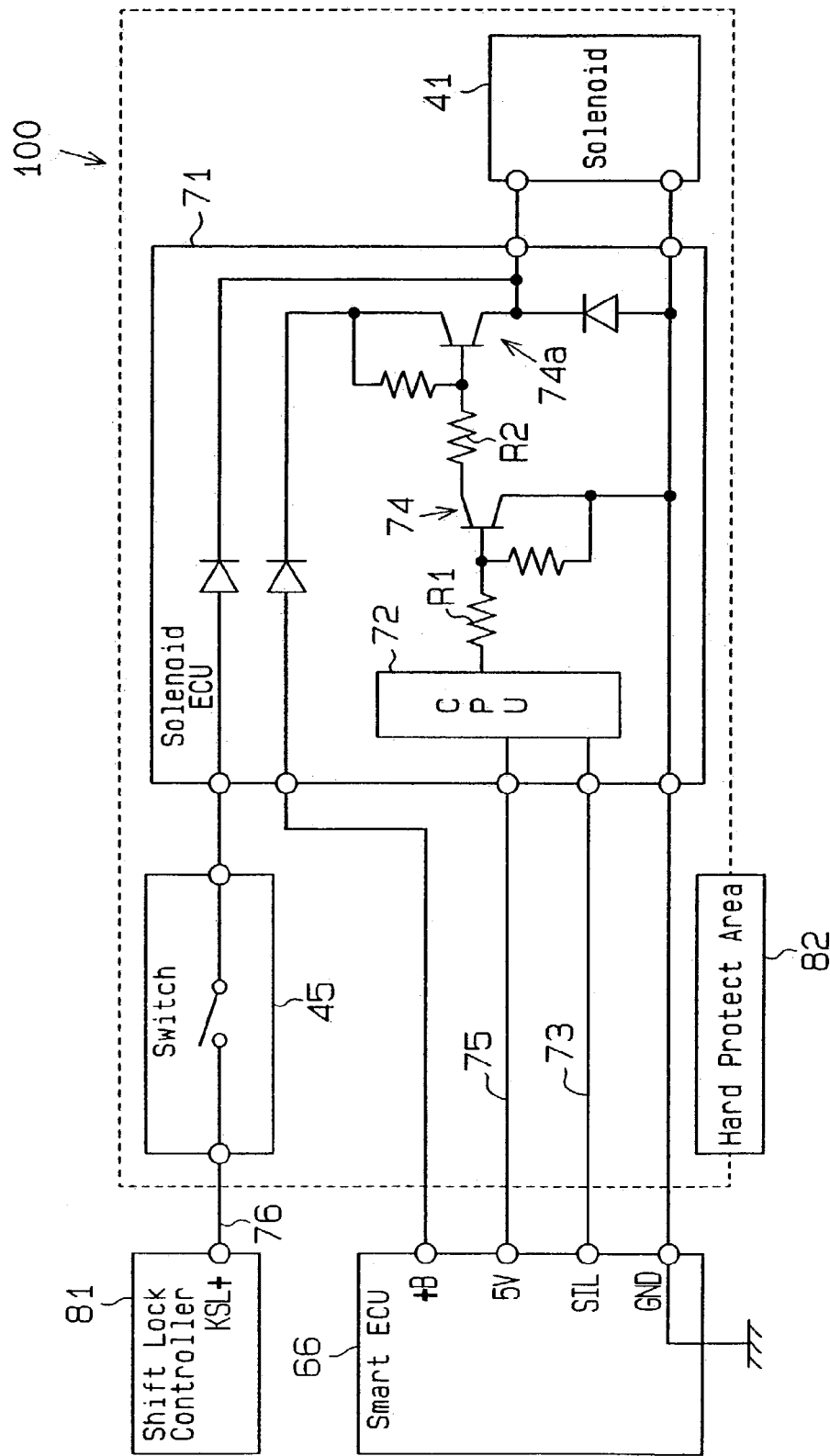
FIG. 4 is a schematic circuit diagram of the activation restricting apparatus of FIG. 1A.

Further, referring to FIG. 4, the shift lock controller 81, which serves as a control means, is connected to the solenoid 41 via the switch 45 and a power line 76. The shift lock controller 81 detects whether the shift lever is in the parking position and whether a shift button of the shift lever is not being pressed. From the detections, the shift lock controller 81 determines whether the vehicle is not moving and inactivates the solenoid 41 even if the switch 45 is ON. As shown in FIG. 4, the solenoid 41 is supplied with power from a battery via the smart ECU 66 or the shift lock controller 81.

The solenoid ECU 71 includes a central processing unit (CPU) 72. The CPU 72 is connected to the base terminal of the transistor 74 via a resistor R1. The collector terminal of the transistor 74 is connected to the base terminal of a transistor 74a. The transistors 74 and 74a amplify the power supplied to the solenoid 41 by the smart ECU 66. A power line 75 and a signal line 73 connect the CPU 72 and the smart ECU 66 to each other. Power is supplied to the CPU 72 through the power line 75. The signal line 73 us used for serial communication to send information from the smart ECU 66 to the CPU 72 on whether encoded ID codes are matched.

The smart ECU 66, which includes a CPU, a ROM, and a RAM (none of which are shown), intermittently generates a request signal. The smart ECU 66 has a predetermined ID code and compares its ID code with an ID code included in the first receiving signal or the second receiving signal when receiving the first or second receiving signal. When the ID codes match, the smart ECU 66 generates an activation signal and provides the activation signal to the CPU 72. Then, the CPU 72 provides the transistor 74 with the activation signal to activate the solenoid 41.

More specifically, if the portable device 51 generates an ID code signal in response to a request signal output from the antenna 62a when the starter knob 22 is in the LOCK position, the smart ECU 66 determines that the portable device 51 is located in the passenger compartment and activates the solenoid 41 for five seconds. The portable device 51 is inserted in the tab 22a, as shown in FIG. 1A, when the power of the portable device 51 weakens or when one does not know how to operate the starter knob 22. In this state, as long as the portable device 51 generates the transponder signal in response to a transponder drive wave, the smart ECU 66 activates the solenoid 41 for five seconds.

Figure 5:
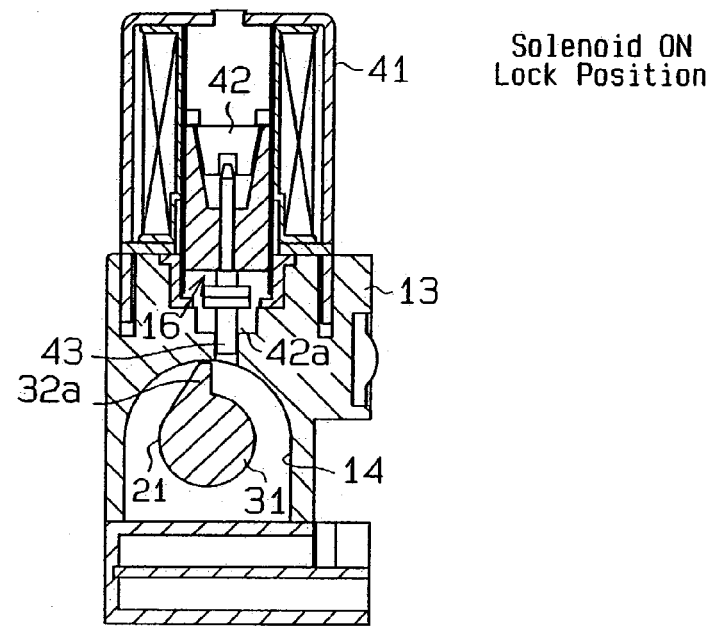
FIGS. 5 to 10 are drawings illustrating the operation of the activation restriction apparatus of FIG. 1A.
Figure 6:
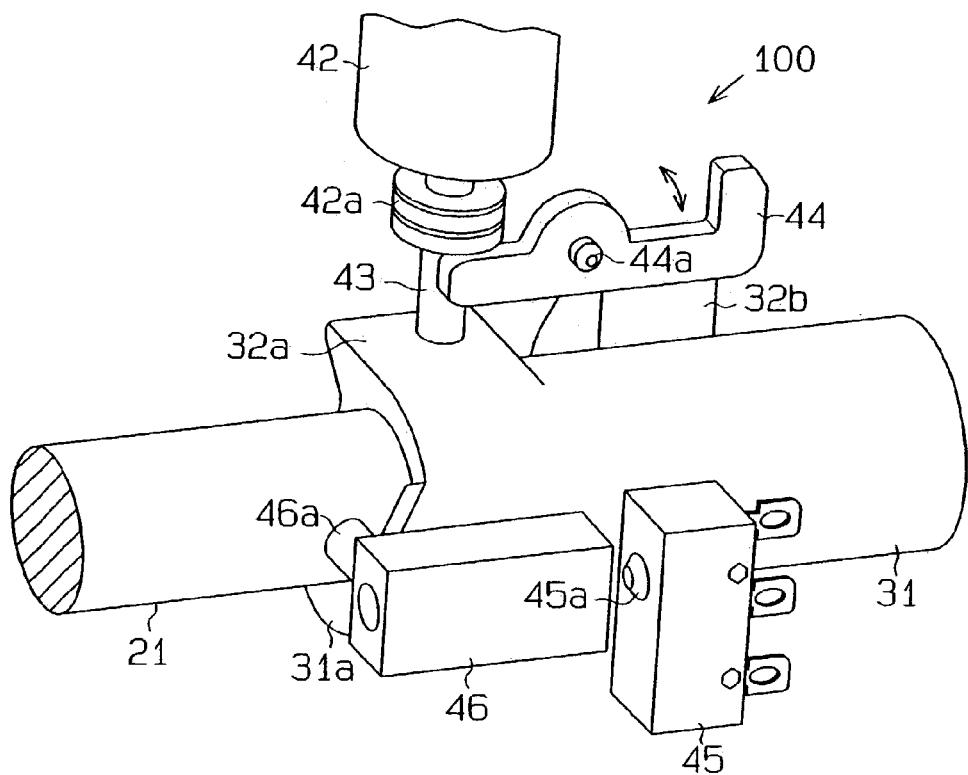
Figure 7:
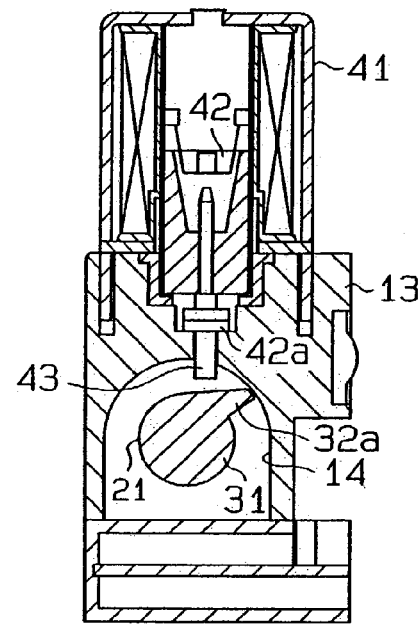

As a result, as shown in FIG. 5, the plunger 42 moves and disengages the stopper pin 43 from the first projection 32a to enable the turning of the starter knob. In this state, after pushing the starter knob 22 in the axial direction, the starter knob 22 is turned to move the starter knob 22 from the LOCK position to the ACC position. Then, when the output of the activation signal from the smart ECU 66 ends, the smart ECU 66 and the solenoid ECU are inactivated. In this state, the turning of the starter knob 22 moves the block 46 away from the contact 45a and turns ON the switch 45, as shown in the state of FIG. 6. Since the shift lever is arranged at the parking position, the solenoid 41 returns to the inactivated state, and the stopper pin 43 projects into the bore 14.

Figure 8:
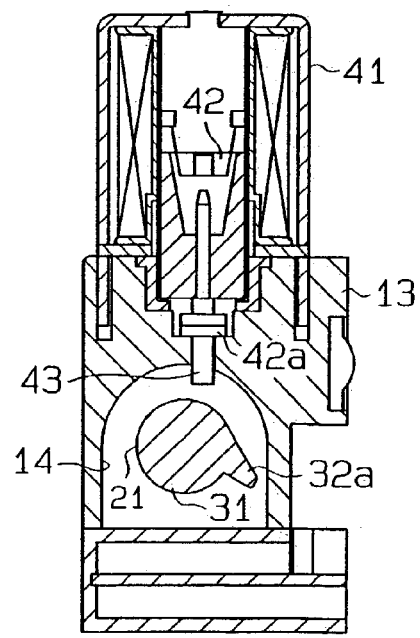

The starter knob 22 is pushed in the axial direction, for example, when a driver does not immediately start the engine after getting into the vehicle to again request TD code verification and to enable the turning of the starter knob 22. Since the rotation of the camshaft 21 from the ACC position to the START position is enabled as shown in the state of FIG. 8, the engine may be started by activating a starting relay (not shown) to drive a starting motor (not shown). Accordingly, the engine starting system 11 functions as a smart ignition apparatus.

Figure 9:
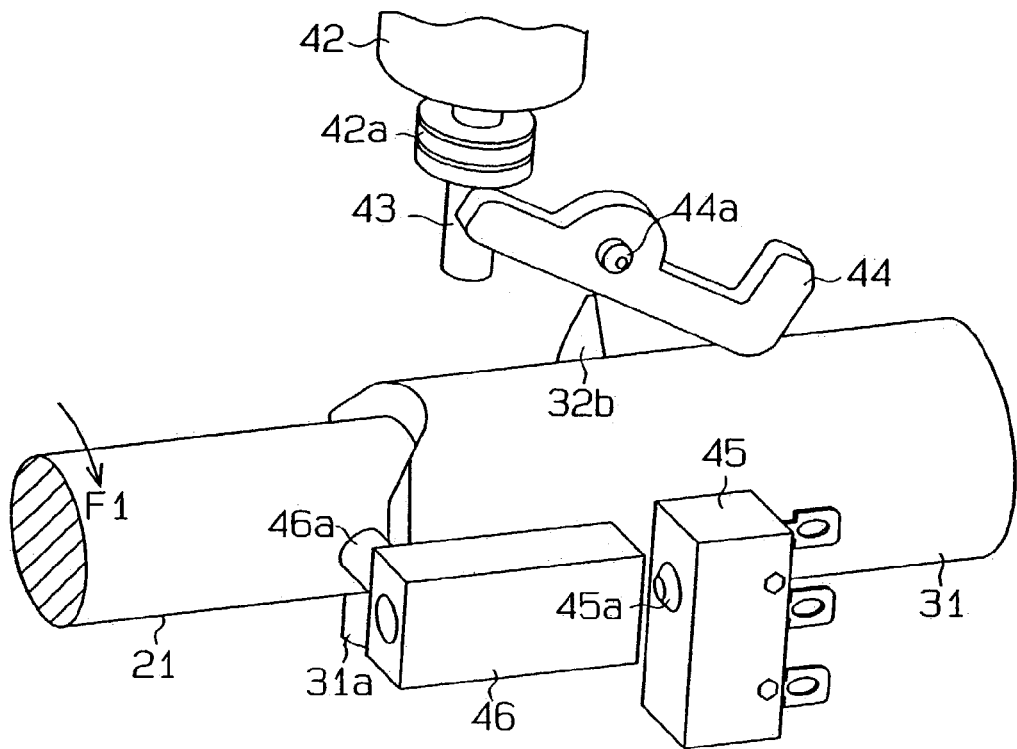

If the shift lever is moved from the parking position to another position when the engine is running, this activates the solenoid 41 and moves the plunger 42 upward, as shown in the state of FIG. 9. Simultaneously, the force of the engaging spring 47 (FIG. 1A) pivots the locking lever 44 so that the locking lever 44 engages the second projection 32b. Therefore, if the driver stops the engine and tries to turn the starter knob 22 in the direction indicated by arrow F1 to the LOCK position when the shift lever is located at a position other than the parking position, the engagement between the locking lever 44 and the second projection 32b prohibits the turning of the starter knob 22.

Figure 10:
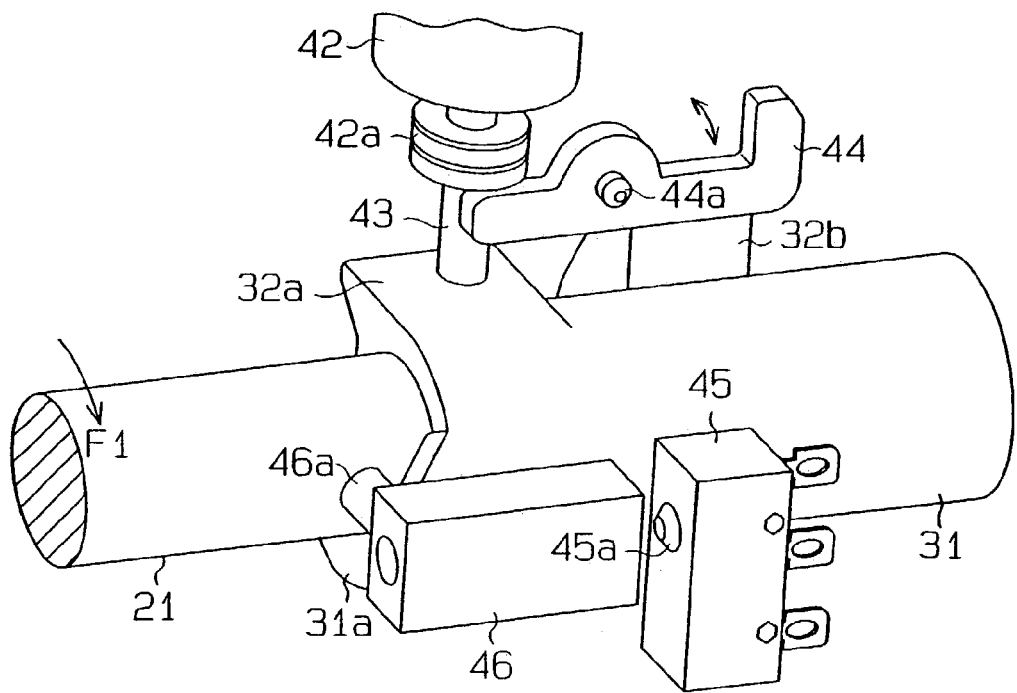

The shift lock controller 81 detects whether the vehicle is not moving when the starter knob 22 is located at the ACC position. In this state, the solenoid 41 is not activated even if the switch 45 is ON since the shift lock controller 81 does not supply the solenoid 41 with power. Thus, as shown in the state of FIG. 10, the plunger 42 moves downward and disengages the locking lever 44 from the second projection 32b to enable the turning of the starter knob 22. By turning the starter knob 22 in this state, the first projection lifts the stopper pin 43 until the starter knob 22 reaches the LOCK position. Then, as shown in the state of FIG. 2, the block 46 contacts the contact 45a and turns on the switch 45. Further, the engagement between the stopper pin 43 and the first projection 32a prohibits the turning of the starter knob 22. Accordingly, the engine starting system 11 functions as a key interlocking mechanism.

The engine starting system activation restricting apparatus 100 of the first embodiment has the advantages described below.

(1) The solenoid 41 enables the starting of the engine with the starter knob 22 when the camshaft 21 is located at the LOCK position. Further, the solenoid 41 disengages the locking lever 44 from the second projection 32b when the starter knob 22 is located at a position other than the LOCK position as long as the switch 45 activates the solenoid 41 and the vehicle is not moving. This enables the starter knob 22 to be turned to the LOCK position. Thus, the same solenoid 41 is used to enable the turning of the starter knob 22 regardless of whether the starter knob 22 is located at the LOCK position or the ACC position. Thus, the solenoid 41 does not occupy much space. This enables the engine starting system 11 to be produced more compactly and improves safety with respect to collisions.

Even when adding a smart ignition apparatus to a vehicle, the engine starting system 11 requires only one solenoid 41. Thus, the same lock body 12, which accommodates the engine starting system 11, may be used even when adding the smart ignition apparatus. This decreases the cost of the engine starting system 11.

(2) The activation and inactivation of the solenoid 41 are performed mechanically by moving the block 46 toward or away from the switch. More specifically, the solenoid 41 is inactivated when the block 46 contacts the contact 45a. The solenoid 41 is activated when the block 46 moves away from the contact 45a. This guarantees that the movement of the switch 45 is enabled.

(3) When the vehicle has an automatic transmission, it can be confirmed that the vehicle is not moving by checking whether the shift lever is located at the parking position. In addition, it can be confirmed that the vehicle is not moving by checking whether the shift button of the shift lever is not being pressed. When it is detected that the vehicle is not moving, the turning of the starter knob 22 to the LOCK position is enabled. In other words, the turning of the starter knob 22 to the LOCK position is prohibited when the vehicle is moving. This improves the safety of the vehicle.

(4) The stopper pin 43 of the solenoid 41 engages the first projection 32a when the solenoid 41 is inactivated. Thus, when the battery goes dead, the stopper pin 43 is not disengaged from the first projection 32a, and the starter knob 22 thus cannot be turned. This improves the security of the vehicle with respect to thefts.

(5) The switch 45 is arranged in the lock body 12. Thus, current does not flow directly to the solenoid 41 even if, for example, a thief intentionally sends current through the power line 76 as long as the switch 45 is OFF. In addition, the solenoid ECU 71, which includes the solenoid 41 and the CPU 72, is located in the lock body 12. Thus, current does not flow directly to the transistor 74 even if, for example, a thief intentionally sends current through the power line 75. This prevents the solenoid 41 from being improperly driven to turn the starter knob 22. Accordingly, the engine is prevented from being started by an unauthorized person. This further improves the security of the vehicle with respect to thefts.

(6) The smart ECU 66 and the solenoid ECU 71 are activated only when the starter knob 22 is turned from the LOCK position to the ACC position. Thus, the smart ECU 66 and the solenoid ECU 71 are inactivated when the smart ECU 66 stops outputting the activation signal. This decreases the current consumed by the engine starting system 11.

(7) The starter knob 22 may be pushed along its axial direction. The time lag that occurs when activating the solenoid 41 (i.e., the time required to activated the solenoid 41) is absorbed during the period in which the starter knob 22 is pushed. This guarantees engagement between the stopper pin 43 and the first projection 32a. Accordingly, the starter knob 22 is prevented from being interfered with by the stopper pin 43.

Figure 11:
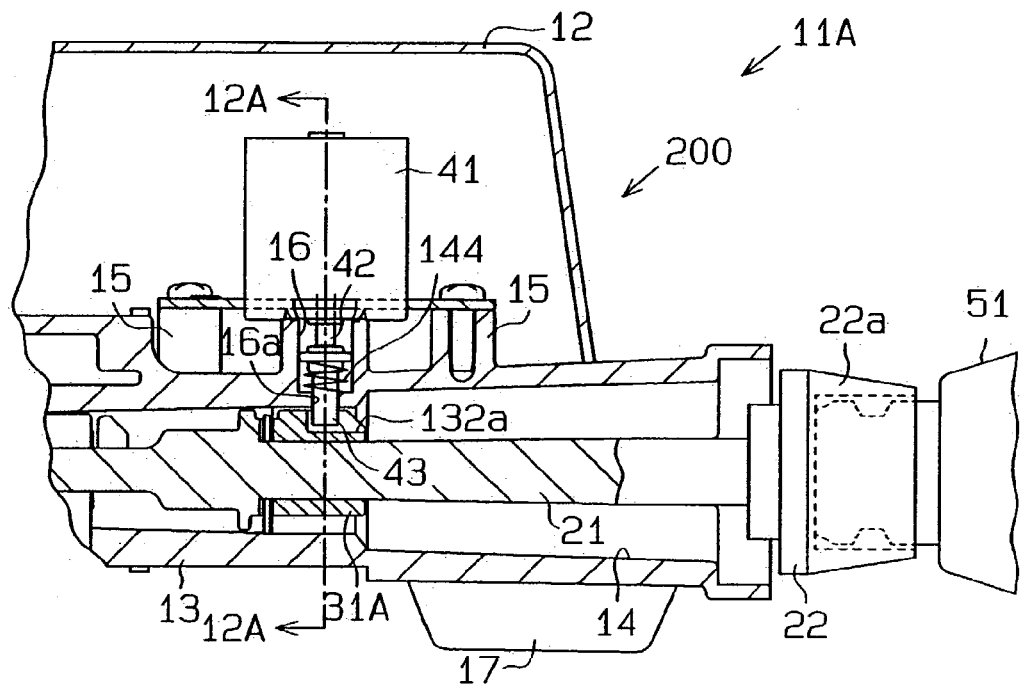
FIG. 11 is a schematic cross-sectional view of an activation restricting apparatus of an engine starting system according to a second embodiment of the present invention.
Figure 12:
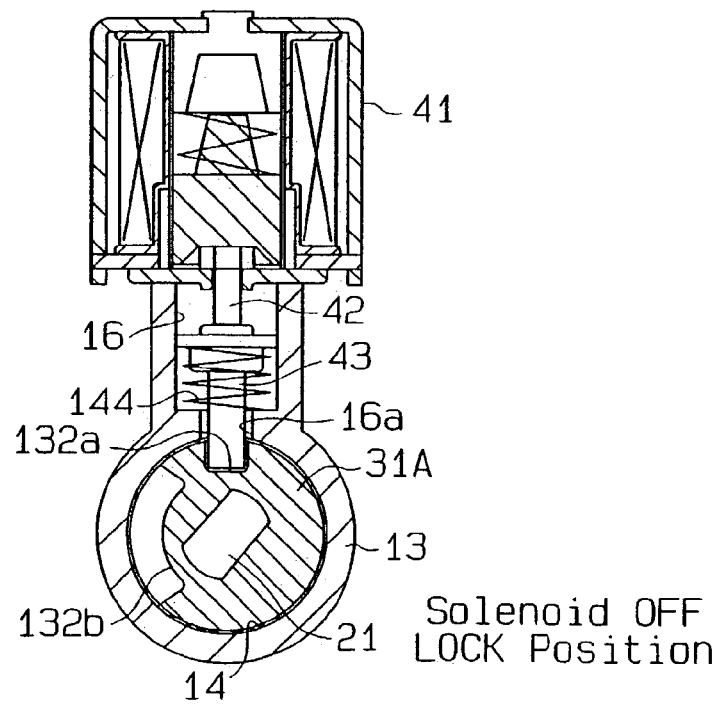
FIG. 12 is a cross-sectional view taken along line 12A-12A in FIG. 11.

FIG. 11 is a cross-sectional view of an engine starting system activation restricting apparatus 200 according to a second embodiment of the present invention. FIG. 12 is a schematic cross-sectional view taken along line 12a-12a. Parts differing from the first embodiment will now be described. Identical parts will not be described.

Referring to FIG. 12, a cam 31A has a first recess (first stopper) 132a and a second recess (second stopper) 132b in lieu of the first and second projections 32a and 32b of the first embodiment. Further, the activation restricting apparatus 200 does not have the locking lever 44 and the switch 45 of the first embodiment.

As shown in FIG. 11, in the second embodiment, an engine starting system 11A includes a cylinder 13, which has an attaching portion 15 and an accommodating portion 16. The accommodating portion 16 is connected to a bore 14 through a plunger insertion hole 16a. A stopper pin 43 extends vertically through the accommodating portion 16. A spring 144 urges the stopper pin 43 upward, as viewed in FIG. 12.

As shown in FIG. 12, the first and second recesses 132a and 132b are arranged in the surface of the cam 31A. The dimension of the second recess 132b in the circumferential direction of the cam 31A is greater than that of the first recess 132a. The first recess 132a corresponds to the LOCK position of a starter knob 22. The second recess 132b corresponds to positions of the starter knob 22 other than the LOCK position (i.e., ACC position, ON position, and START position).

The stopper pin 43 is engaged with and disengaged from the first recess 132a or the second recess 132b by the solenoid 41. More specifically, when the solenoid 41 is inactivated, the stopper pin 43 is held in a state engaged with the first recess 132a or the second recess 132b. When the solenoid 41 is activated, the stopper pin 43 is disengaged from the first recess 132a or the second recess 132b. When a camshaft 21 is located at a position corresponding to the LOCK position, the stopper pin 43 engages the first recess 132a. As shown in the state of FIG. 15C, when the camshaft 21 is located at the ACC position, the stopper pin 43 engages the second recess 132b.

The electronic configuration of the engine starting system 11A will now be discussed with reference to FIGS. 13 and 14.

Figure 13:
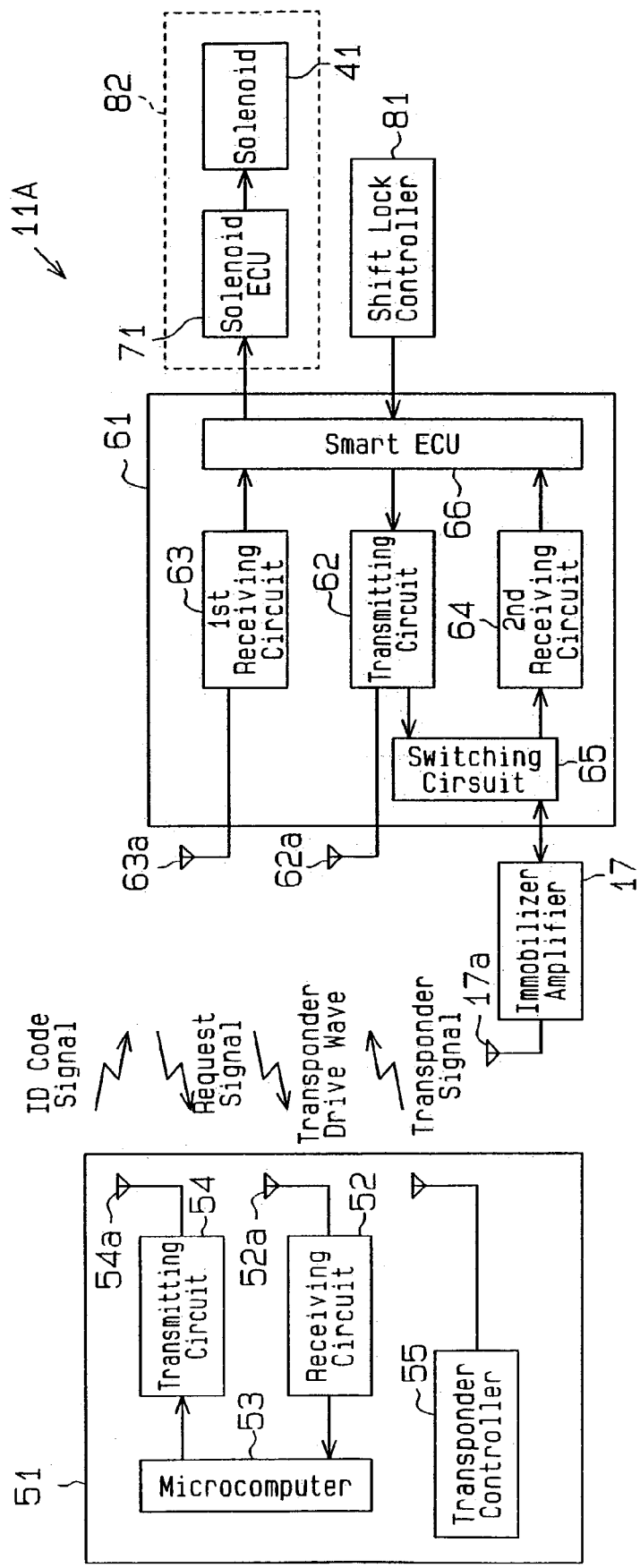
FIG. 13 is a schematic electric block diagram of an engine starting system in the second embodiment.
Figure 14:
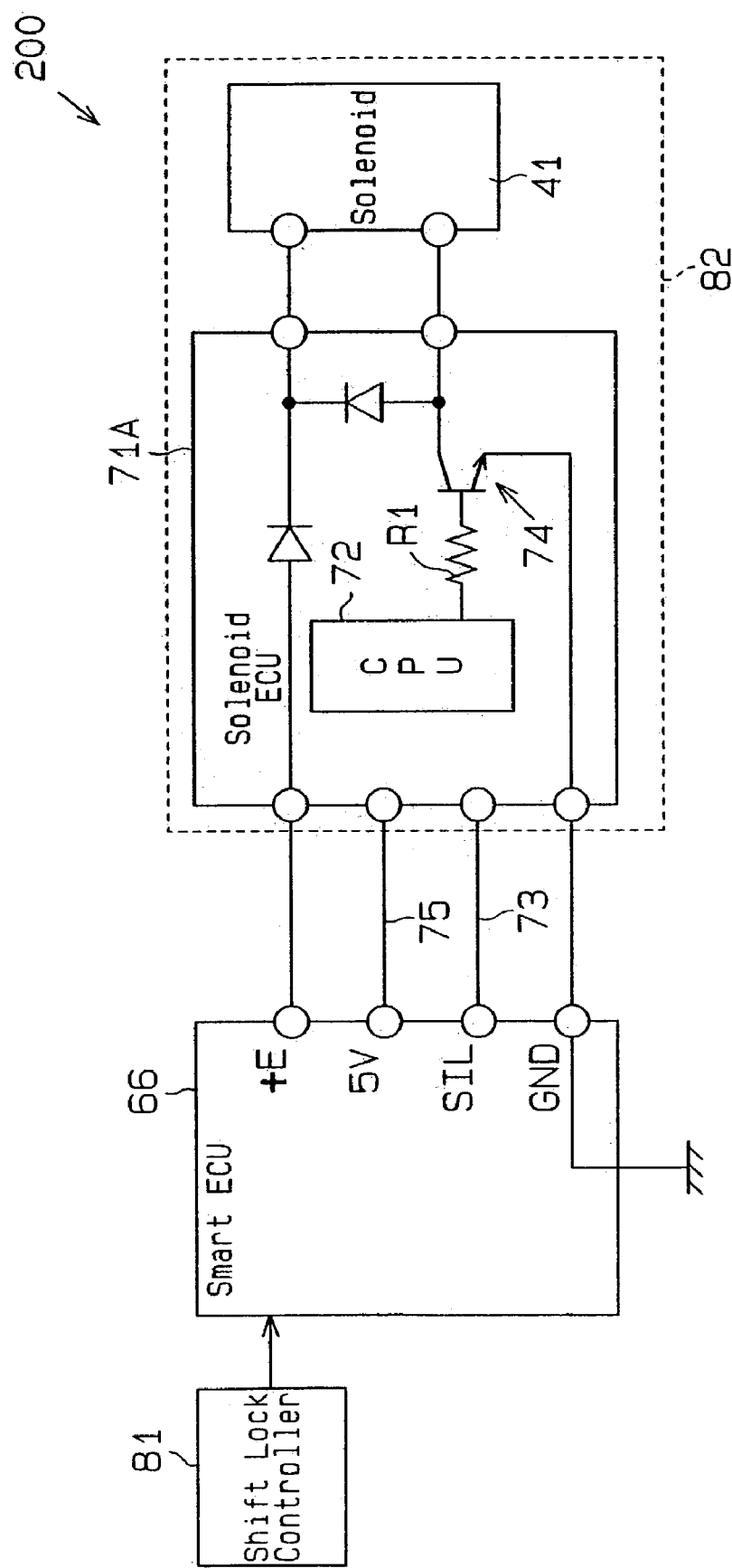
FIG. 14 is a schematic circuit diagram of the activation restricting apparatus of FIG. 11.

Referring to FIG. 13, the portable device 51 includes a receiving circuit, a microcomputer 53, a transmitting circuit 54, and a transponder controller 55. The communication controller 61, which is installed in a vehicle, includes a transmitting circuit 62, a first receiving circuit 63, a second receiving circuit 64, a switching circuit 65, and a smart ECU 66, which serves as a control means.

In the second embodiment, a shift lock controller 81, which serves as a control means, is connected to the smart ECU 66. The shift lock controller 81 detects whether a shift lever of the automatic transmission for the vehicle is in the parking position and whether a shift button arranged on the shift lever is not being pressed. From the detections, the shift lock controller 81 determines whether the vehicle is not moving and generates a vehicle stop signal. The vehicle stop signal is provided to the smart ECU 66.

The smart ECU 66 is connected to a solenoid ECU 71A, which controls the activation of the solenoid 41. Referring to FIG. 14, the smart ECU 66 supplies the solenoid 41 with power. The solenoid ECU 71A includes a CPU 72. The CPU 72 is connected to the base terminal of a transistor 74 via a resistor R1.

If the portable device 51 generates an ID code signal in response to a request signal output from an antenna 62a when the starter knob 22 is in the LOCK position, the smart ECU 66 determines that the portable device 51 is located in the passenger compartment and activates the solenoid 41 for five seconds.

Figure 15A:
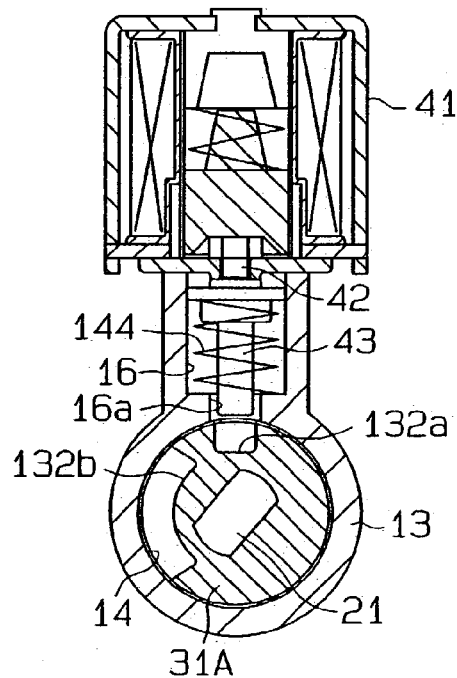
FIGS. 15A to 15D are drawings illustrating the operation of the activation restriction apparatus of FIG. 11.
Figure 15B:
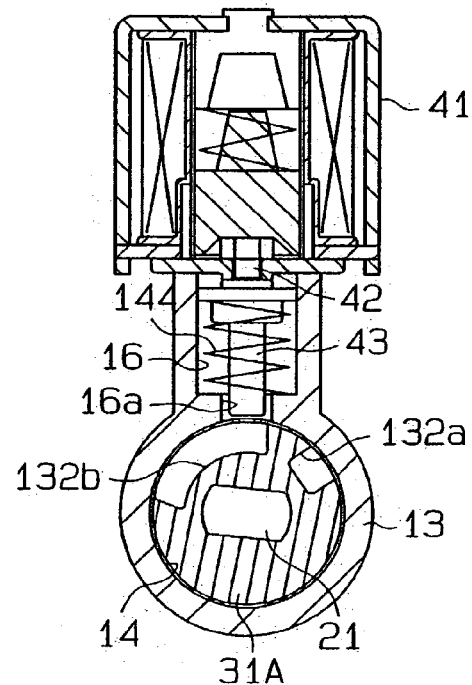
Figure 15C:
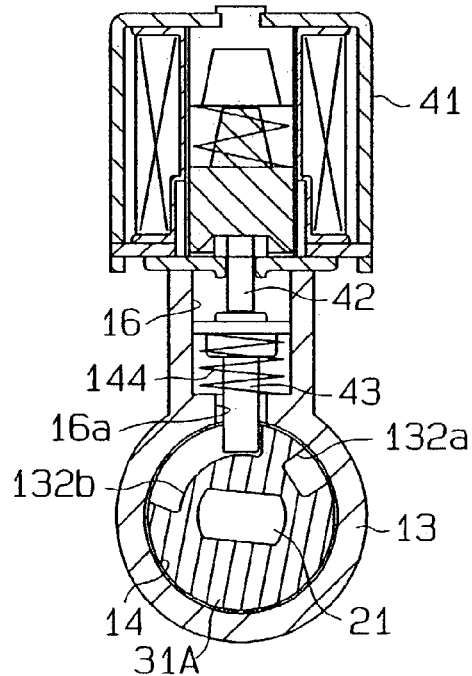

This moves the plunger 42 and disengages the stopper pin 43 from the first recess 132a to enable turning of the starter knob 22, as shown in the state of FIG. 15A. In this state, by pushing the starter knob 22 in the axial direction and then rotating the starter knob 22, the starter knob 22 is moved to the ACC position, as shown in the state of FIG. 15B. Then, the solenoid 41 is inactivated so that the stopper pin 43 engages the second recess 132b.

Figure 15D:
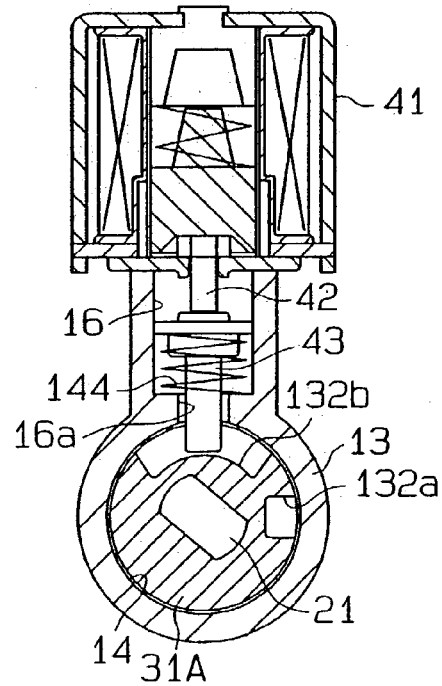

In the states of FIGS. 15C and 15D, the turning of the starter knob 22 from the ACC position to the START position is enabled. Thus, the engine may be started by activating a starting relay (not shown) to drive a starting motor (not shown). Accordingly, the engine starting system 11A functions as a smart ignition apparatus.

The solenoid ECU 71A activates the solenoid 41 when the starter knob 22 is located at the ACC position as long as the vehicle is not moving. More specifically, the CPU 72 generates an activation signal in accordance with a vehicle stop signal from the shift lock controller 81 and provides the transistor 74 with the activation signal. The transistor 74 activates the solenoid 41 in response to the activation signal. This moves the plunger 42 and disengages the stopper pin 43 from the second recess 132b to enable turning of the starter knob 22. From this state, the starter knob 22 is pushed in the axial direction and then turned to the LOCK position. Subsequently, the solenoid 41 is inactivated. This engages the stopper pin 43 with the first recess 132a and prohibits turning of the starter knob 22, as shown in the state of FIG. 12. Accordingly, the engine starting system 11A functions as a key interlocking mechanism.

The engine starting system activation restricting apparatus 200 of the second embodiment has the same advantages as those of the first embodiment.

It should be apparent to those skilled in the art that the present invention may be embodied in many other specific forms without departing from the spirit or scope of the invention. Particularly, it should be understood that the present invention may be embodied in the following forms.

In each of the above embodiments, the determination that the vehicle is not moving may be performed based on only one of the conditions of whether the shift lever is in the parking position and whether the shift button is being pressed. Further, other conditions may be used to detect that the vehicle is not moving. For example, if a vehicle velocity sensor detects that the vehicle velocity is 0 Km/h, it may be determined that the vehicle is not moving.

In each of the above embodiments, the solenoid 41 may be replaced by a motor that serves as an actuator. In such a case, the motor has a shaft to which a pinion gear is attached. A rack gear, which is meshed with the pinion gear, is attached to the stopper pin 43 along the longitudinal direction of the stopper pin 43. The motor is driven to move the stopper pin 43.

In each of the embodiments, the starter knob 22 may be pulled along its axial direction.

In the first embodiment, the stopper pin 43 may be held in a state engaged with the first projection 32a when the solenoid 41 is activated and disengaged from the first projection 32a when the solenoid 41 is inactivated. In this case, the shift lock controller 81 activates the solenoid 41 when detecting that the vehicle is not moving.

In the first embodiment, the smart ECU 66 and the solenoid ECU 71 may remain activated even after the starter knob 22 is turned to the ACC position from the LOCK position.

In the second embodiment, the stopper pin 43 may be held in a state engaged with the first recess 132a or the second recess 132b when the solenoid 41 is activated and disengaged from the first recess 132a or the second recess 132b when the solenoid 41 is inactivated.

The present examples and embodiments are to be considered as illustrative and not restrictive, and the invention is not to be limited to the details given herein, but may be modified within the scope and equivalence of the appended claims.

What is claimed is:

1. An apparatus for use with a vehicle for restricting activation of a starting system of an engine and for use with a portable device that transmits a first ID code, the apparatus comprising:

an operating means for manually starting and stopping the engine and including a manually operatable knob and a shaft coupled to the knob and integrally rotating with the knob, the knob having a plurality of operation positions including a LOCK position in which the operating means is locked, the shaft monolithically including a first stopper, which prohibits movement of the knob from the LOCK position to a position other than the LOCK position, and a second stopper, which prohibits movement of the knob to the LOCK position from a position other than the LOCK position;

an actuator for engaging the first stopper only when the actuator is inactivated;

an intervening member arranged between the actuator and the second stopper and moving in cooperation with the actuator to engage with and disengage from the second stopper;

a switching means for switching activation and inactivation of the actuator;

a cooperative member, which moves toward and away from the switching means in cooperation with the operation of the operating means to switch activation and inactivation of the actuator; and a control means connected to the actuator to control the actuator, wherein the control means controls the actuator to disengage the actuator from the first stopper for enabling manual operation of the operating means for starting the engine when the control means detects a situation in which the knob is in the LOCK position and a first ID code received from the portable device matches a predetermined second ID code of the control means, and wherein the control means controls the actuator to disengage the intervening member from the second stopper for enabling manual operation of the operating means from a position other than the LOCK position to the LOCK position only when the control means detects a situation in which the knob is in a position other than the LOCK position, the actuator is being activated by the switching means, and a vehicle with which the apparatus is used is not moving.

2. The apparatus according to claim 1,
wherein the first stopper includes a first projection engaged with the actuator; and
the second stopper includes a second projection.

3. The apparatus according to claim 2, wherein a vehicle with which the apparatus is used includes electric devices, and the control means includes:
an ID code verification means for determining whether the first ID code matches the second ID code; and
an actuator control means for controlling the actuator;
wherein the plurality of operation positions include an ACC position in which electric devices are supplied with power; and
the ID code verification means and the actuator control means are inactivated when the operating means is moved from the LOCK position to the ACC position.

4. The apparatus according to claim 3, wherein the knob is turned about its axis to move the operating means between the ACC position and the LOCK position, the knob being movable in its axial direction, and wherein the switching means is mechanically activated, wherein
the cooperative member mechanically activates the switching means by moving toward and away from the switching means when the operating means is turned.

5. The apparatus according to claim 3, further comprising:
a cover for covering the actuator, the actuator control means, and the switching means.

6. The apparatus according to claim 2, wherein a vehicle with which the apparatus is used includes an automatic transmission having a shift lever shiftable to a plurality of positions, including a parking position, and the control means determines that the vehicle is not moving when the control means detects a situation in which the shift lever is in the parking position.

7. The apparatus according to claim 6, wherein the shift lever has a button for shifting the shift lever between different positions, and the control means determines that the vehicle is not moving when the control means detects a situation in which the shift lever is in the parking position and the button is not being pressed.

8. The apparatus according to claim 2, wherein the actuator is a solenoid including a stopper pin engaged with the first projection when the solenoid is inactivated and disengaged from the first projection when the solenoid is activated.

* * * * *